United States Patent
Kretschmer et al.

(10) Patent No.: US 8,610,591 B2
(45) Date of Patent: Dec. 17, 2013

(54) METHOD AND ARRANGEMENT FOR MONITORING THE BEARING CURRENTS IN AN ELECTRICAL MACHINE

(75) Inventors: Hans-Richard Kretschmer, Berlin (DE); Arno Steckenborn, Berlin (DE); Oliver Theile, Berlin (DE)

(73) Assignee: Siemens Aktiengesellschaft, München (GE)

( * ) Notice: Subject to any disclaimer, the term of this patent is extended or adjusted under 35 U.S.C. 154(b) by 507 days.

(21) Appl. No.: 13/055,818

(22) PCT Filed: Jul. 21, 2009

(86) PCT No.: PCT/EP2009/059341
§ 371 (c)(1),
(2), (4) Date: Jan. 25, 2011

(87) PCT Pub. No.: WO2010/010081
PCT Pub. Date: Jan. 28, 2010

(65) Prior Publication Data
US 2011/0175631 A1    Jul. 21, 2011

(30) Foreign Application Priority Data
Jul. 25, 2008  (DE) .......................... 10 2008 035 613

(51) Int. Cl.
*G01R 27/26*    (2006.01)

(52) U.S. Cl.
USPC . 340/682; 340/648; 340/870.37; 324/765.01; 324/679; 324/658; 324/690; 324/725; 324/661; 324/662; 324/688; 702/183; 702/48; 73/862.191

(58) Field of Classification Search
USPC .......................................... 324/679; 340/682
See application file for complete search history.

(56) References Cited

U.S. PATENT DOCUMENTS

| | | | |
|---|---|---|---|
| 3,176,286 A | | 3/1965 | Dschen |
| 3,904,940 A | * | 9/1975 | Burrus .......................... 340/682 |
| 4,097,794 A | * | 6/1978 | Burrus, Jr. .................... 324/510 |

(Continued)

FOREIGN PATENT DOCUMENTS

| | | |
|---|---|---|
| CH | 399963 A | 9/1965 |
| EP | 1835598 A1 | 9/2007 |
| WO | WO 8910533 A1 | 11/1989 |
| WO | WO 2006134068 A1 | 12/2006 |

*Primary Examiner* — Huy Q Phan
*Assistant Examiner* — Benjamin M Baldridge
(74) *Attorney, Agent, or Firm* — Henry M. Feiereisen LLC

(57) ABSTRACT

The invention inter alia relates to a method for monitoring the bearing current of an electrical machine (10). An electrode (100) arranged at a distance (d) to a shaft and the shaft—due to the gap (S) between the electrode and the shaft—produce a measurement capacitance (C) and an electric shift current (i) which flows through the measurement capacitance when there is a temporal change of the voltage (Ug) applied between the shaft and the housing is measured. A measurement signal (Ms) indicating a bearing current flow is generated when the shift current or a measurement variable produced by the shift current meets a predetermined trigger criterion. Preferably, the electrode has a circular inner contour so that the gap is annular. The annular inner contour results in an error compensation in the case of a balance error of the shaft because the factor dC/dt remains at least substantially constant. Due to the contactless measurement of the shift current, no contact brushes for contacting the shaft are required. The method can be used irrespective of whether the bearings are insulated from the machine housing or not.

16 Claims, 5 Drawing Sheets

(56) References Cited

U.S. PATENT DOCUMENTS

| | | | |
|---|---|---|---|
| 4,147,982 A | | 4/1979 | Emery |
| 4,237,454 A | * | 12/1980 | Meyer ............................ 340/682 |
| 4,511,837 A | * | 4/1985 | Vermeiren et al. ............ 324/671 |
| 4,722,021 A | * | 1/1988 | Hornung et al. ................ 361/49 |
| 6,460,013 B1 | * | 10/2002 | Nippes ........................... 702/183 |
| 6,727,725 B2 | * | 4/2004 | Devaney et al. .......... 324/765.01 |
| 6,967,586 B2 | * | 11/2005 | Narita et al. ................... 340/682 |
| 7,777,516 B2 | * | 8/2010 | Zhou et al. ............... 324/765.01 |
| 2002/0083779 A1 | * | 7/2002 | Narita et al. .............. 73/862.191 |
| 2004/0263342 A1 | * | 12/2004 | Matlock et al. ................ 340/648 |
| 2008/0079435 A1 | * | 4/2008 | Williams et al. ............... 324/457 |

\* cited by examiner

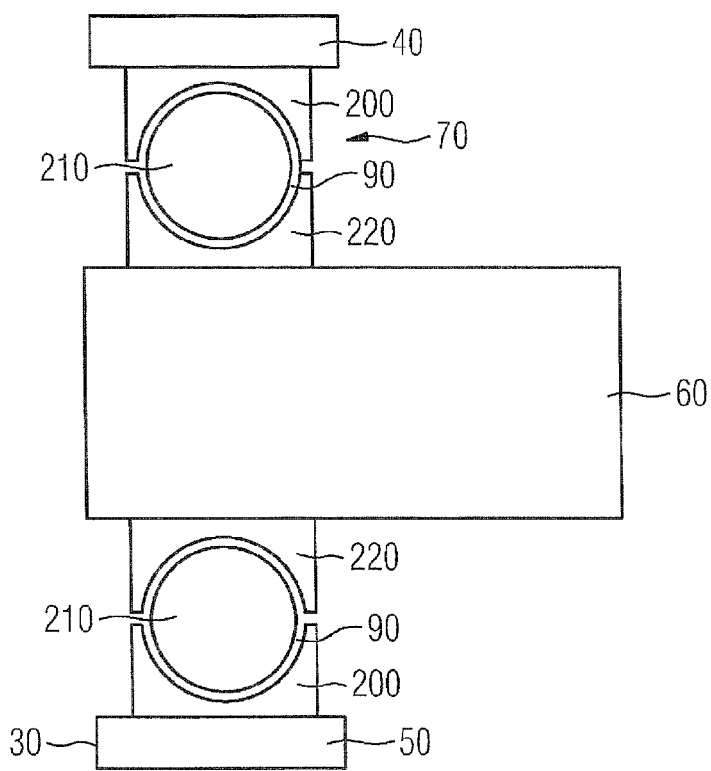
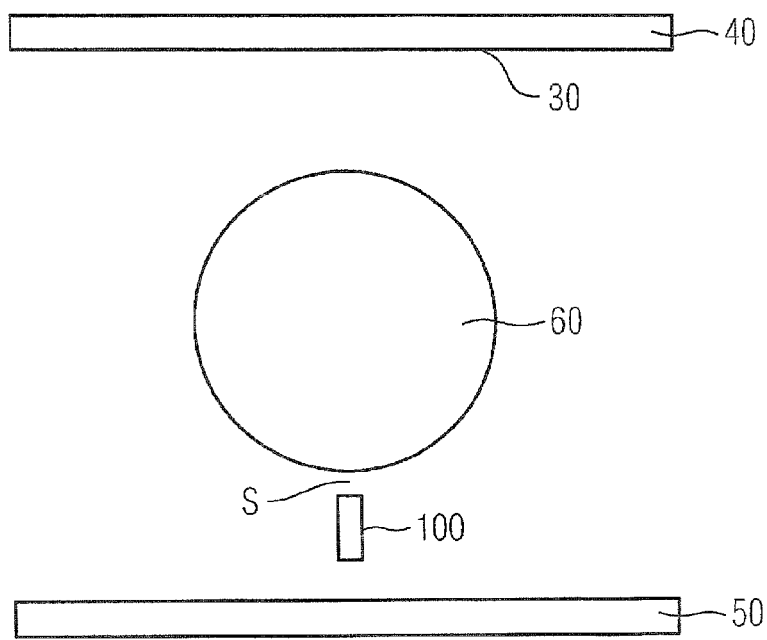

FIG 7
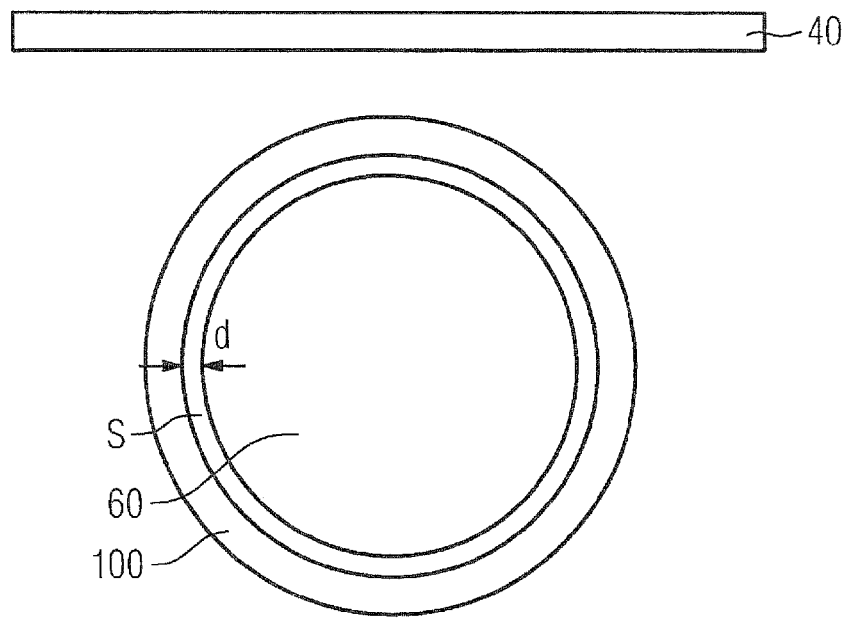
FIG 8
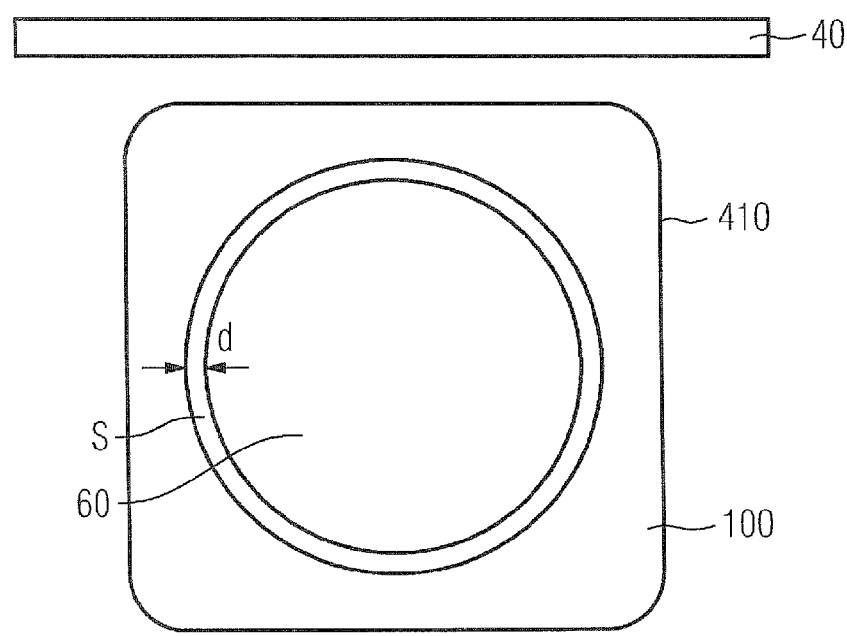

METHOD AND ARRANGEMENT FOR MONITORING THE BEARING CURRENTS IN AN ELECTRICAL MACHINE

CROSS-REFERENCES TO RELATED APPLICATIONS

This application is the U.S. National Stage of International Application No. PCT/EP2009/059341, filed Jul. 21, 2009, which designated the United States and has been published as International Publication No. WO 2010/010081 and which claims the priority of German Patent Application, Serial No. 10 2008 035 613.1, filed Jul. 25, 2008, pursuant to 35 U.S.C. 119(a)-(d).

BACKGROUND OF THE INVENTION

The invention relates to a method and an arrangement for monitoring the bearing currents in an electrical machine.

Methods of this type are known, for example, from the international patent application WO 2006/134068. One of the methods described in this document provides for the electrical voltage which is present between a shaft in the electrical machine and the housing to be measured with the aid of electrical contact brushes, which rest mechanically on the shaft and make electrical contact with it. The voltage measured in this way is evaluated in an evaluation device, and a measurement signal is produced when a bearing current occurs.

Furthermore, the cited document discloses another method for monitoring the bearing current; in this other method, a bearing which bears the shaft of the machine is electrically isolated from the machine housing. The electrical voltage between the bearing and the housing is measured, and evaluated, in order to detect a bearing current event.

SUMMARY OF THE INVENTION

The invention is based on the object of specifying a method by means of which a bearing current can be monitored particularly easily, and with as little complexity as possible.

According to one aspect of the invention, this object is achieved by a method for monitoring the bearing current in an electrical machine, in particular an electric motor or an electrical generator, which has a shaft which is mounted by means of at least one bearing in a housing such that it can rotate, wherein a measurement capacitance is formed by an electrode, which is arranged at a distance from the shaft, and by the shaft—on the basis of the gap between the electrode and the shaft—and an electrical displacement current is measured which flows through this measurement capacitance when the voltage which is present between the shaft and the housing rate of change, and a measurement signal which indicates a bearing current flow is produced when the displacement current or a measurement variable formed by this displacement current complies with a predetermined initiation criterion.

Advantageous refinements of the method according to the invention are specified in the dependent claims.

The invention accordingly provides that a measurement capacitance is formed by an electrode, which is arranged at a distance from the shaft, and by the shaft—on the basis of the gap between the electrode and the shaft—and an electrical displacement current is measured which flows through this measurement capacitance when the voltage which is present between the shaft and the housing rate of change, and a measurement signal which indicates a bearing current flow is produced when the displacement current or a measurement variable formed by this displacement current complies with a predetermined initiation criterion.

One major advantage of the method according to the invention is that this method does not require any contact brushes in order to allow a voltage change in the shaft-housing voltage which is present on the shaft to be measured. Specifically, in contrast to the prior art, the method according to the invention does not, for example, involve measuring the voltage which is present on the shaft per se, but of evaluating the capacitive electric displacement current flowing away from the shaft when a voltage change occurs, and of evaluating this displacement current. The displacement current is measured by a measurement electrode which is arranged at a distance from the shaft, that is to say without touching it, and forms a capacitance with the shaft. Because the electric displacement current is measured, there is therefore no need to make electrical contact with the shaft, as a result of which there is no need for contact brushes, which are dependent on wear, and require continuous maintenance of the machine.

A further major advantage of the invention is that it can be used with any desired electrical machines; for example, bearing current events can be measured independently of whether the bearings are or are not isolated from the housing.

The measurement capacitance is particularly preferably formed by an electrode which has a circular hole, through which the shaft is passed and which is arranged concentrically with respect to the shaft such that the gap is annular. A circular internal contour and a circular gap make it possible to avoid measurement errors when the shaft is unbalanced. When unbalanced, the distance between the shaft and the electrode will change as a function of position during the rotation of the shaft, as a result of which a current component which has nothing to do with the discharging process and is caused solely as a result of the variation of the gap over time because of the unbalance of the shaft additionally occurs, in addition to the electric displacement current when the shaft is electrically discharged, in accordance with the relationship $i \approx C \cdot dUg/dt + Ug \cdot dC/dt$ (C: measurement capacitance, Ug: shaft-housing voltage, i is current). This current component $If = Ug \cdot dC/dt$ has no noticeable disturbance effect if the gap is annular, because, although some ring sections may be closer to the shaft at some times than at other times during the rotation of the shaft, the opposite ring sections in opposition will assume a greater distance from the shaft, in such a way that compensation occurs because the factor dC/dt remains small.

The measurement capacitance is preferably formed by an annular electrode, that is to say an electrode which has both a circular internal contour and a circular external contour.

According to one preferred refinement of the method, the initiation criterion is considered to be satisfied when the displacement current or a measurement variable formed by this displacement current reaches or exceeds a predetermined limit current.

According to another preferred refinement of the method, the displacement current is passed through a resistance, and the initiation criterion is considered to be satisfied when the measurement voltage dropped across the resistance, or a variable derived from it, satisfies a predetermined voltage initiation criterion. Preferably, the voltage initiation criterion is considered to be satisfied when the measurement voltage dropped across the resistance, or a variable derived from it, reaches or exceeds a predetermined limit voltage.

In order to suppress external disturbance influences, it is considered to be advantageous if the measurement voltage dropped across the resistance is subjected to high-pass and/or bandpass filtering, and the measurement signal is produced when the filtered measurement voltage, or a variable derived from it, satisfies the predetermined voltage initiation criterion.

Furthermore, the invention relates to an arrangement having an electrical machine, in particular an electric motor or an electrical generator, which has a shaft which is mounted by means of at least one bearing in a housing such that it can rotate, and having a measurement device for monitoring the bearing current.

The object of this aspect of the invention is to specify an arrangement which is as independent of wear as possible and allows monitoring of the bearing current irrespective of whether bearings which bear the shaft of the machine are or are not electrically isolated from the housing of the machine.

According to another aspect of the invention, this object is achieved by an arrangement having an electric machine, in particular an electric motor or a generator, which has a shaft which is mounted by means of at least one bearing in a housing such that it can rotate, and having a measurement device for monitoring the bearing current, wherein the measurement device has an electrode which is arranged at a distance from the shaft and, together with the shaft, forms a measurement capacitance on the basis of the gap between the shaft and the electrode, and the measurement device has an evaluation device which is connected to the electrode and detects an electric displacement current which flows through the measurement capacitance when the voltage which is present between the shaft and the housing rate of change, and produces a measurement signal, which indicates a bearing current flow, when the displacement current or a measurement variable formed by this displacement current complies with a predetermined initiation criterion.

Advantageous refinements of the arrangement according to the invention are specified in dependent claims.

With regard to the advantages of the arrangement according to the invention, reference should be made to the above statements in conjunction with the method according to the invention, since the advantages of the arrangement correspond substantially to those of the method according to the invention.

BRIEF DESCRIPTION OF THE DRAWING

The invention will be explained in more detail in the following text with reference to exemplary embodiments; in this case, by way of example:

FIG. 2 shows the bearing for a shaft in the arrangement as shown in FIG. 1, in the form of a cross section;

FIG. 3 shows the positioning of an electrode of the arrangement as shown in FIG. 1, in the form of a cross section;

FIG. 7 shows the bearing for a shaft in the arrangement as shown in FIG. 6, and

FIG. 8 shows a third exemplary embodiment of an arrangement having an electrical machine and having a measurement device for monitoring the bearing current, in which an electrode of the arrangement has an annular internal contour and an external contour of any other design shape.

DETAILED DESCRIPTION OF PREFERRED EMBODIMENTS

For the sake of clarity, the same reference symbols are always used for identical or comparable components in the figures.

Figure 1:
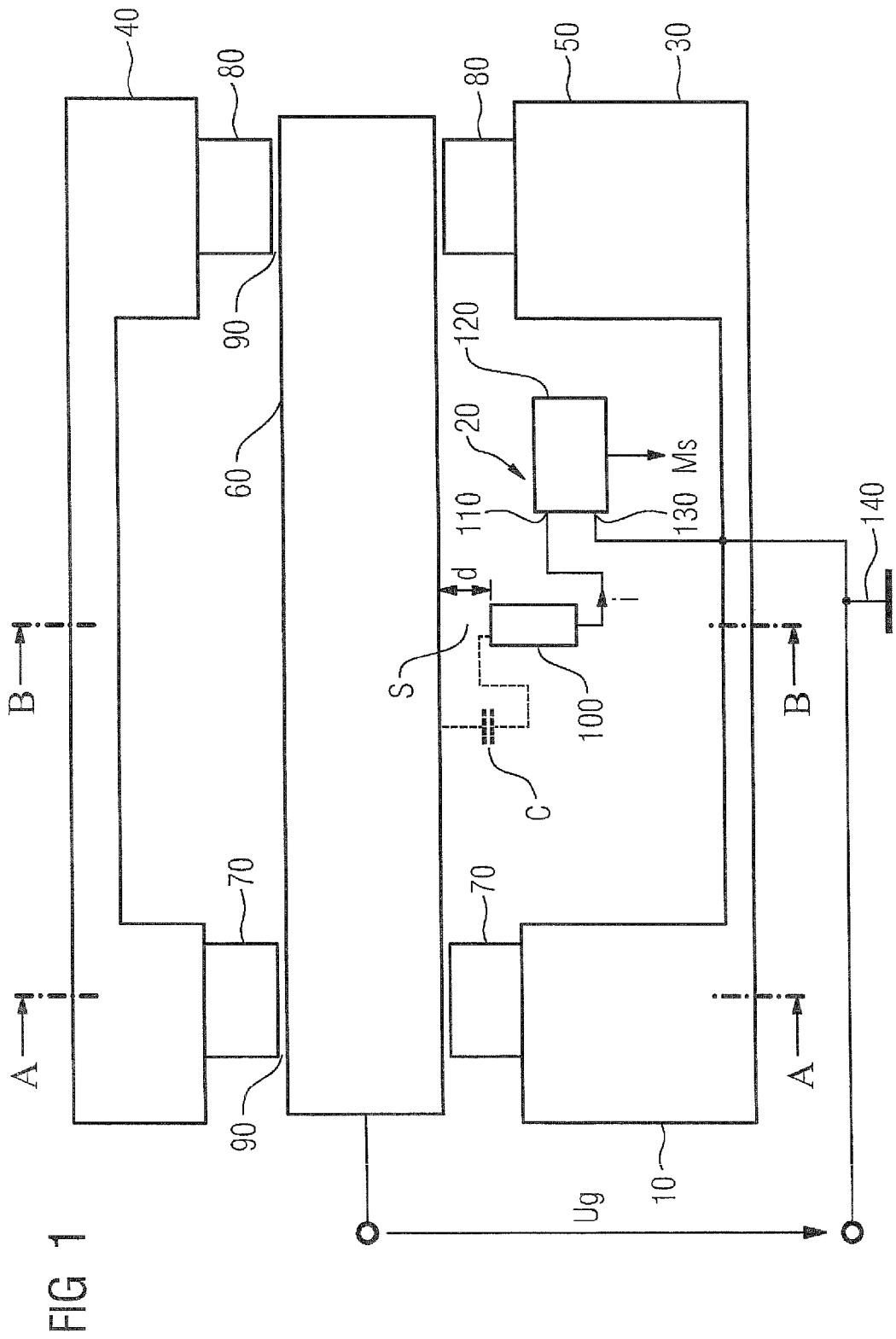
FIG. 1 shows a first exemplary embodiment of an arrangement having an electrical machine, and having a measurement device for monitoring the bearing current, in the form of a longitudinal section.

FIG. 1 shows an exemplary embodiment of an arrangement which has an electrical machine 10 which, by way of example, may be an electric motor or an electrical generator, as well as a measurement device 20 for monitoring the bearing current.

As can be seen in FIG. 1, the machine 10 is equipped with a housing 30 which is formed by an upper housing part 40 and a lower housing part 50.

A shaft 60 of the machine 10 is held by two bearings 70 and 80 such that it can rotate. The two bearings 70 and 80 are illustrated only schematically in FIG. 1. There is generally a lubricant film between the shaft 60 and the two bearings 70 and 80, or within the two bearings 70 and 80, although this is not shown in any more detail in FIG. 1, and is merely indicated by the reference symbol 90.

The bearing 70 and the bearing 80 may be electrically conductively connected to the two housing parts 40 and 50; instead of this, both bearings 70 and 80 may also be electrically isolated from the housing 30 by means of an insulator, which is not illustrated in FIG. 1. It is irrelevant to the operation of the measurement device 20 whether electrical isolation is or is not provided between the bearings 70 and 80 on the one hand and the housing 30 on the other hand.

As can also be seen in FIG. 1, the measurement device 20 is equipped with an electrode 100 which is arranged at a distance d from the shaft 60. A gap is therefore formed between the electrode 100 and the shaft 60, and is annotated with the reference symbol S in FIG. 1. The gap S results in an electrical measurement capacitance C being formed between the shaft 60 and the electrode 100, and this is illustrated by a dotted line in FIG. 1.

The electrode 100 is electrically connected to one measurement input 110 of an evaluation device 120. Another measurement input 130 of the evaluation device 120 is connected to the housing ground 140, which is the electrical potential of the housing 30 of the machine 10.

FIG. 2 shows one exemplary embodiment of a bearing for the shaft 60 on the basis of the bearing 70, in the form of a longitudinal section. As can be seen, the bearing 70 has an outer bearing ring 200, which is indirectly or directly connected to the housing 30, as well as a multiplicity of roller bodies 210. The roller bodies 210 are arranged between the outer bearing ring 200 and an inner bearing ring 220, which is connected to the shaft 60. The inner bearing ring 220 may be a component of the bearing 70 or may be part of the shaft 60; however, the latter is irrelevant to the operation of the bearing.

The lubricant film 90 is located between the roller bodies 210 and the two bearing rings 200 and 220. As already stated, it is irrelevant whether the outer bearing ring 200 is electrically isolated from the housing 30, or is electrically connected to it.

When the machine 10 is stationary, the roller bodies 210 are located in the inner and outer bearing rings. The roller bodies may be balls, cylinders, needles or may have other physical shapes. In general, particularly in the case of very large machines, the roller bodies and the bearing shells are composed of steel. This results in the shaft 60 being electrically shorted to the housing 30 when the machine is stationary. When the shaft 60 is rotated, the roller bodies 210 run on the lubricant film 90; the latter is fed from a wedge-shaped lubricant supply in front of the respective roller body. The lubricant film leads to electrical isolation, which depends on the viscosity of the lubricant (which changes with age, and with the temperature of the bearing, etc.). Depending on the machine size, a voltage may now build up between the shaft 60 and the housing 30, which voltage may depend on the characteristics of the bearing, on the motor control (for example frequency converter and its termination at the motor, etc.) and on the quality of the bearing itself (grooves, roughness, etc.). At a certain voltage, the isolation of the lubricant film 90 breaks down (about 10 . . . 12 V in the case of small motors, and 70 . . . 100 V in the case of large motors) and a bearing current occurs. By way of example, the measurement of the bearing current will be explained in more detail further below.

FIG. 3 illustrates the shaft 60 in the form of a cross section, to be precise along a section B-B as shown in FIG. 1. The figure shows the electrode 100, which is arranged at a distance from the shaft 60, such that the gap S is formed. The evaluation device, which is connected to the electrode 100, cannot be seen in this section.

Figure 4:
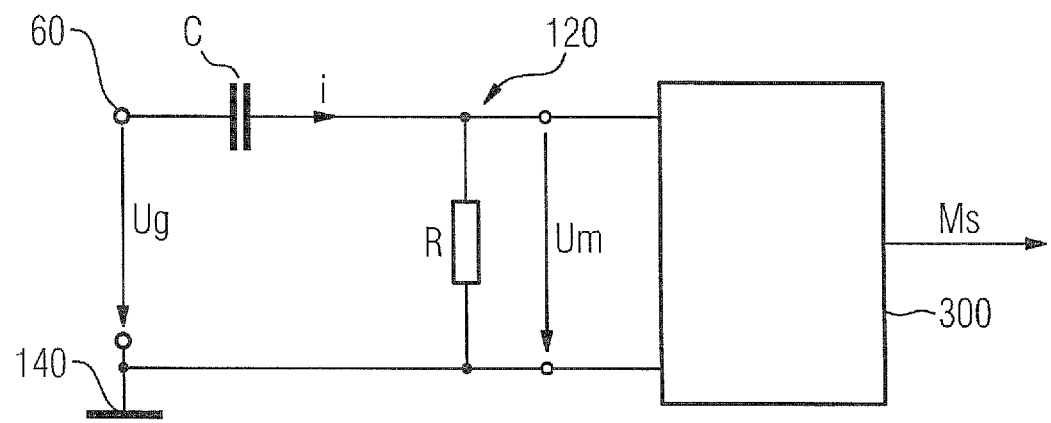
FIG. 4 shows an electrical equivalent circuit of a first exemplary embodiment of an evaluation device for the arrangement as shown in FIG. 1.

FIG. 4 will now be used to explain how the evaluation device 120 as shown in FIG. 1 operates. For this purpose, FIG. 4 shows the electrical equivalent circuit of the evaluation device 120, by way of example. FIG. 4 shows the measurement capacitance C to which an electrical resistance R is connected. The resistance R is followed by an electrical comparator 300.

When a change now occurs in the electrical potential which is present on the shaft 60, for example because an electric discharge current is flowing, then the electrical voltage Ug between the shaft 60 and the housing ground 140 will accordingly change. This voltage change results in an electric displacement current i, which flows through the resistance R and leads to a voltage drop across this resistance R. The current i is given approximately by:

$$i \approx C^* dUg/dt$$

The voltage drop across the resistance R is also used as the measurement voltage Um, and is fed into the comparator 300. The comparator 300 compares the measurement voltage Um with a predetermined minimum voltage, and produces a measurement signal Ms, which indicates a bearing current flow, if the measurement voltage Um exceeds the predetermined minimum voltage.

The values for R and C are preferably in each case matched to the type of machine (motor/generator, physical size, design, power); by way of example, test measurements are carried out for this purpose with different values for R and C, until an R/C value pair have been determined with optimum measurement characteristics for the respective machine.

By way of example, the comparator 300 produces a binary measurement signal, for example with a logic 1, when the predetermined minimum voltage is exceeded. If, in contrast, the comparator 300 finds that the voltage Um does not reach the predetermined minimum voltage, then, for example, it produces a binary output signal with a logic 0 on its output side, as the measurement signal Ms.

The evaluation device 120 makes use of the fact that a discharge current from the shaft 60 via the bearing 70 or 80 to the housing 30 always leads to a relatively large voltage change dUg/dt, and that, accordingly, a bearing current flow leads to a correspondingly large voltage Um, which can be detected by the comparator 300. In contrast, other current flows, which are not based on a discharge of a potential which is present on the shaft 60, will generally have lower rates of change, as a result of which they are not detected by the evaluation device 120, specifically because the quotient dUg/dt for these other current flows will be too low.

Figure 5:
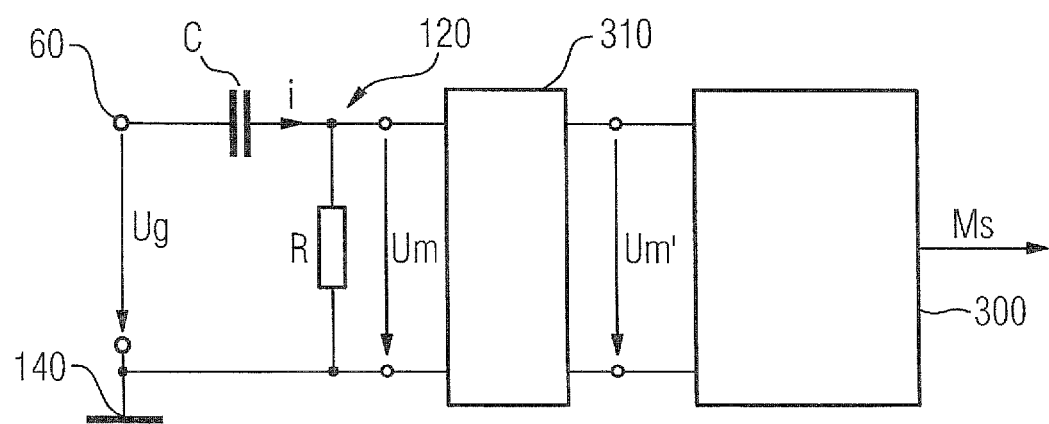
FIG. 5 shows a second exemplary embodiment of an evaluation device for the arrangement as shown in FIG. 1.

FIG. 5 shows an alternative embodiment of the evaluation device 120 as shown in FIG. 1. In this exemplary embodiment, in addition to the comparator 300, the evaluation device 120 has a bandpass filter 310, which is arranged electrically between the electrical resistance R and the comparator 300.

The function of the bandpass filter 310 is to filter out of the measurement voltage Un disturbance frequencies which do not result from a discharge process on the shaft 60, and to form a filtered measurement voltage Um' in order that disturbance frequencies do not adversely affect the method of operation of the comparator 300. The bandpass filter will preferably have only a small amount of attenuation in a frequency range between 1 MHz and 100 MHz, since the discharge-current frequencies to be detected by the evaluation device 120 will lie in this frequency range. The signal Um is suppressed outside said frequency range between 1 MHz and 100 MHz.

Figure 6:
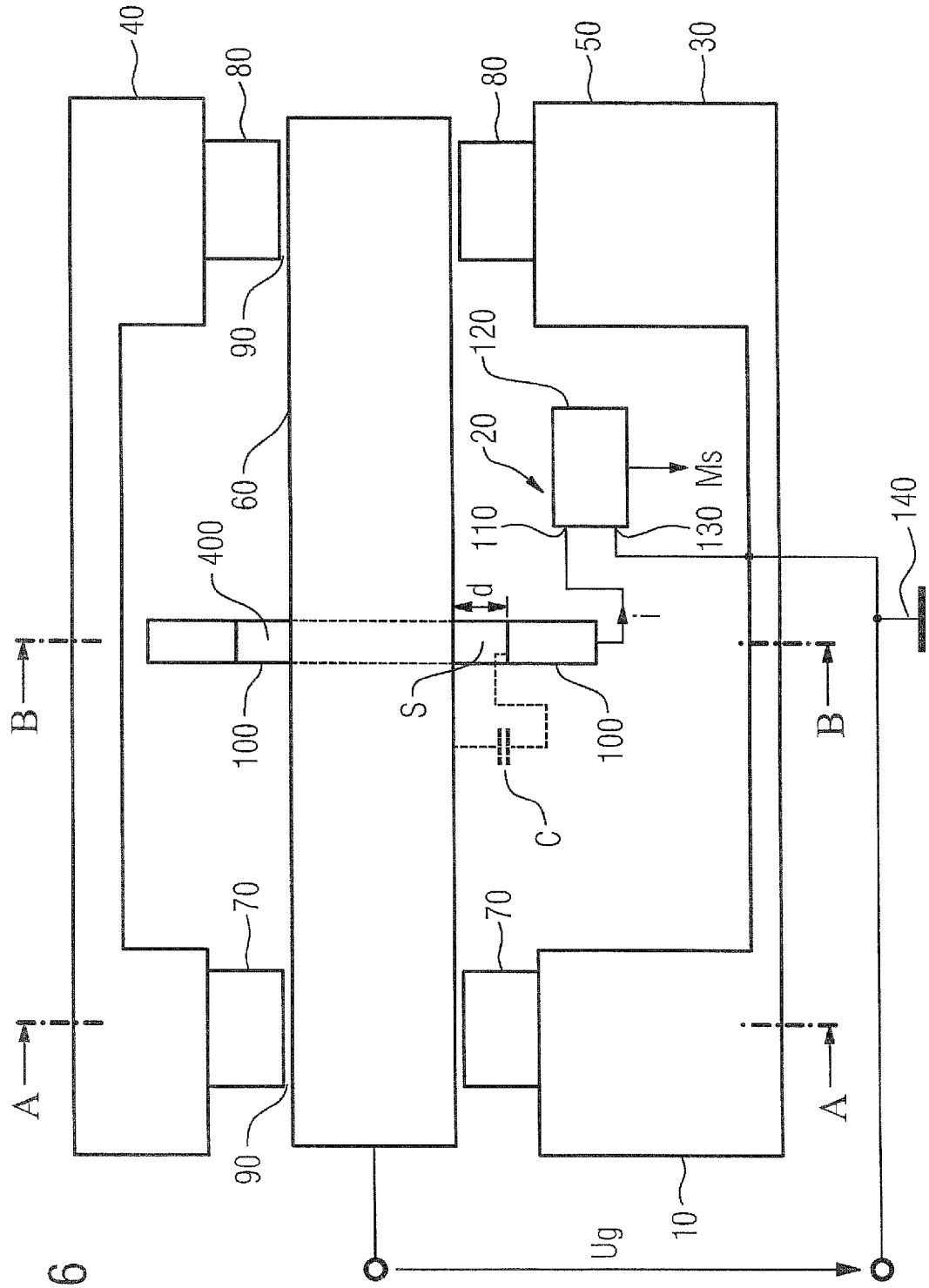
FIG. 6 shows a second exemplary embodiment of an arrangement having an electrical machine and having a measurement device for measuring the bearing current, in which an electrode of the arrangement has an annular internal and external contour.

FIG. 6 shows a second exemplary embodiment of an arrangement having a machine 10 and a measurement device 20. In contrast to the exemplary embodiment shown in FIG. 1, the electrode 100 in the exemplary embodiment shown in FIG. 6 is chosen to have a different design. Therefore, as can be seen from FIG. 6, the electrode 100 does not approach the shaft 60 like a rod, as is shown by way of example in FIG. 3, but, instead of this, has an annular opening 400 through which the shaft 60 is passed. The mechanical design of the electrode 100 and the arrangement of the shaft 60 relative to the electrode 100 are illustrated once again in FIG. 7, in the form of a cross section along the cross-section line B-B shown in FIG. 6. As can be seen, the electrode 100 has an annular shape, and both its internal contour and its external contour are circular. Because of the circular internal contour, an annular gap S is formed between the shaft 60 and the electrode 100.

One major advantage of the annular configuration of the electrode 100 is that, if the shaft 60 is unbalanced, a considerably smaller error current will occur than in the case of the exemplary embodiment shown in FIG. 1. This will be explained in more detail briefly in the following text:

If the shaft 60 in the exemplary embodiment shown in FIG. 1 is not borne ideally and an unbalance occurs, then the distance d between the shaft 60 and the electrode 100 will vary during the rotation of the shaft 60, as a result of which, on the basis of the relationship:

$$i \approx C^* dUg/dt + Ug^* dC/dt$$

in addition to the electric displacement current, a current component will also additionally occur during an electrical discharge from the shaft 60, which has nothing to do with the discharge process and is caused solely by the variation of the gap S over time, because of the unbalance of the shaft. This current component or error current can therefore be calculated to be:

$$If = Ug^* dC/dt$$

The error current If will not cause any significant disturbance in the exemplary embodiment shown in FIG. 6, specifically because, although any unbalance during rotation of the shaft will result in some ring sections being closer to the shaft at some times than at other times, the opposite ring sections will, however, in opposition be at a greater distance from the shaft 60. In other words, this therefore leads to compensation, and to the error current being largely eliminated, since those ring sections which would lead to a high capacitance at times because of the shorter distance between the shaft 60 and the annular electrode 100 are compensated for by other ring sections whose capacitance component is actually less because of the greater distance between the shaft 60 and the annular electrode 100.

In summary, in the case of the exemplary embodiment shown in FIG. 6, the annular internal contour of the electrode 100 and therefore the annular shape of the gap S result in better measurement accuracy than in the case of the electrode configuration shown in FIG. 1.

FIG. 8 shows a third exemplary embodiment of the configuration of the electrode 100 as shown in FIG. 1 and FIG. 6. FIG. 8 shows the electrode 100 in the form of a cross section, as well as the arrangement of the shaft 60 which is passed through the electrode 100. As can be seen from FIG. 8, the electrode 100 has an annular internal contour, as a result of which an annular gap S is formed between the electrode 100 and the shaft 60.

In contrast to the exemplary embodiment shown in FIG. 6, the external contour 410 of the electrode 100 is, however, not annular, but is of any other desired shape.

The annular internal contour and the annular shape of the gap S once again results in the error compensation, as already explained in conjunction with FIGS. 6 and 7, in the event of mechanical unbalancing of the shaft 60, specifically because, if the distance d between individual sections of the electrode 100 and the shaft 60 varies over time, other electrode sections, in general the respectively opposite electrode sections, will be further away, thus resulting in compensation for the error current overall $$If=Ug*dC/dt$$

because the factor dC/dt is very small.

The invention claimed is:

1. A method for monitoring a bearing current in an electrical machine, which has a shaft rotatably mounted in a housing by way of at least one bearing, comprising the steps of:
   forming a measurement capacitance between the shaft and an electrode spaced from the shaft by a gap, with the measurement capacitance determined by the gap,
   measuring an electrical displacement current flowing through the measurement capacitance, wherein the displacement current is generated by a temporal change of a voltage built up between the shaft and the electrode during the operation of the electrical machine, and
   producing a measurement signal indicative of a bearing current flow when the displacement current or a measurement variable formed from this displacement current satisfies a predetermined triggering criterion.

2. The method of claim 1, wherein the electrical machine is an electric motor or an electrical generator.

3. The method of claim 1, wherein the electrode has a circular internal contour, through which the shaft is passed, and which is arranged concentrically with respect to the shaft such that the gap is annular.

4. The method of claim 1, wherein the predetermined triggering criterion is satisfied when the displacement current or a measurement variable formed from this displacement current reaches or exceeds a predetermined limit current.

5. The method of claim 1, wherein the displacement current flows through a resistance, producing a measurement voltage, and the predetermined triggering criterion is satisfied when the measurement voltage or a variable derived from the measurement voltage satisfies a predetermined voltage triggering criterion.

6. The method of claim 5, wherein the voltage triggering criterion is satisfied when the measurement voltage or a variable derived from the measurement voltage reaches or exceeds a predetermined limit voltage.

7. The method of claim 5, wherein the measurement voltage is high-pass-filtered or bandpass-filtered, and wherein the measurement signal is produced when the high-pass-filtered or band pass-filtered measurement voltage, or a variable derived from the high-pass-filtered or bandpass-filtered measurement voltage, satisfies the predetermined voltage triggering criterion.

8. The method of claim 5, wherein the electrode is electrically connected to the housing.

9. An arrangement, comprising:
   an electric machine having a shaft that is rotatably mounted in a housing by way of at least one bearing, and
   a measurement device for monitoring a bearing current, wherein the measurement device comprises:
   an electrode that is spaced from the shaft by a gap and forms in conjunction with the shaft a measurement capacitance, with the measurement capacitance being determined by the gap, and
   an evaluation device that is connected to the electrode and detects an electric displacement current flowing through the measurement capacitance, wherein the displacement current is generated by a temporal change of a voltage between the shaft and the electrode during the operation of the electrical machine, with the electric displacement current producing a measurement signal indicative of a bearing current flow when the displacement current or a measurement variable formed from this displacement current satisfies a predetermined triggering criterion.

10. The arrangement of claim 9, wherein the electrical machine is an electric motor or an electrical generator.

11. The arrangement of claim 9, wherein the electrode has a circular internal contour, through which the shaft is passed, and which is arranged concentrically with respect to the shaft such that the gap is annular.

12. The arrangement of claim 9, wherein the evaluation device is constructed such that the triggering criterion is satisfied when the displacement current or a measurement variable formed from the displacement current reaches or exceeds a predetermined limit current.

13. The arrangement of claim 9, wherein the electric displacement current flows through an electrical resistance which is connected to the electrode, producing a measurement voltage, and the evaluation device is constructed such that the triggering criterion is satisfied when the measurement voltage or a variable derived from the measurement voltage satisfies a predetermined voltage triggering criterion.

14. The arrangement of claim 13, wherein the evaluation device is constructed such that the triggering criterion is satisfied when the measurement voltage or a variable derived from the measurement voltage reaches or exceeds a predetermined limit voltage.

15. The arrangement of claim 13, wherein the evaluation device comprises a high-pass filter or a bandpass filter connected to the electrical resistance, and the evaluation device is constructed such that the triggering criterion is satisfied when the high-pass-filtered or bandpass-filtered measurement voltage, or a variable derived from the high-pass-filtered or band pass-filtered measurement voltage, satisfies the predetermined voltage triggering criterion.

16. The arrangement of claim 9, wherein the electrode is electrically connected to the housing.